United States Patent
Hu et al.

(10) Patent No.: US 7,337,234 B2
(45) Date of Patent: Feb. 26, 2008

(54) RETRY TECHNIQUE FOR MULTI-TIER NETWORK COMMUNICATION SYSTEMS

(75) Inventors: Wei Hu, Palo Alto, CA (US); Juan Loaiza, Redwood City, CA (US)

(73) Assignee: Oracle International Corporation, Redwood Shores, CA (US)

(*) Notice: Subject to any disclaimer, the term of this patent is extended or adjusted under 35 U.S.C. 154(b) by 737 days.

(21) Appl. No.: 10/118,203

(22) Filed: Apr. 5, 2002

(65) Prior Publication Data

US 2003/0191831 A1    Oct. 9, 2003

(51) Int. Cl.
G06F 15/173 (2006.01)
G06F 15/16 (2006.01)
G08C 25/02 (2006.01)
H04L 12/28 (2006.01)

(52) U.S. Cl. .............. 709/239; 709/227; 709/219; 714/748; 370/218

(58) Field of Classification Search ........ 709/227–229, 709/204–207, 238–244; 714/4, 25, 748, 714/16–18; 370/241–253, 218, 216–228; 719/313–317
See application file for complete search history.

(56) References Cited

U.S. PATENT DOCUMENTS

| | | | | |
|---|---|---|---|---|
| 5,235,599 A | * | 8/1993 | Nishimura et al. | 714/4 |
| 5,361,256 A | * | 11/1994 | Doeringer et al. | 370/390 |
| 5,832,239 A | * | 11/1998 | Gavin et al. | 710/105 |
| 5,862,125 A | * | 1/1999 | Russ | 370/228 |
| 5,905,872 A | * | 5/1999 | DeSimone et al. | 709/245 |
| 5,983,090 A | * | 11/1999 | Aoki | 455/403 |
| 6,122,363 A | * | 9/2000 | Friedlander et al. | 379/230 |
| 6,163,856 A | * | 12/2000 | Dion et al. | 714/4 |
| 6,327,243 B1 | * | 12/2001 | Gregorat | 370/218 |
| 6,343,067 B1 | * | 1/2002 | Drottar et al. | 370/231 |
| 6,367,018 B1 | * | 4/2002 | Jain | 726/2 |
| 6,445,704 B1 | * | 9/2002 | Howes et al. | 370/392 |
| 6,651,103 B1 | * | 11/2003 | Markowitz et al. | 709/231 |
| 6,813,240 B1 | * | 11/2004 | Shah | 370/228 |
| 6,836,470 B1 | * | 12/2004 | Bowen et al. | 370/329 |
| 6,854,007 B1 | * | 2/2005 | Hammond | 709/206 |
| 6,856,593 B2 | * | 2/2005 | Nakajima | 370/218 |
| 6,859,834 B1 | * | 2/2005 | Arora et al. | 709/227 |
| 6,862,430 B1 | * | 3/2005 | Duffy et al. | 455/11.1 |
| 6,977,908 B2 | * | 12/2005 | de Azevedo et al. | 370/254 |

(Continued)

FOREIGN PATENT DOCUMENTS

WO    WO98/26559 A1    6/1998

OTHER PUBLICATIONS

Steve Loughran, "Making Web Services that Work," Sep. 29, 2002, XP-002249178, pp. 1-56.

(Continued)

*Primary Examiner*—Joseph E. Avellino
(74) *Attorney, Agent, or Firm*—Hickman Palermo Truong & Becker LLP

(57) ABSTRACT

A system is provided to manage retry communications between a client and a data source. The system includes a plurality of logical components that sequentially combine to form a communication path for a client communication. At least one of the components in the communication path is designated as a retry component. The retry component retries failed client communications for all of the components in the communication path.

52 Claims, 7 Drawing Sheets

U.S. PATENT DOCUMENTS

| | | | |
|---|---|---|---|
| 6,985,960 B2* | 1/2006 | Takashima et al. | 709/238 |
| 2001/0025310 A1* | 9/2001 | Krishnamurthy et al. | 709/223 |
| 2002/0023143 A1* | 2/2002 | Stephenson et al. | 709/218 |
| 2002/0034182 A1* | 3/2002 | Mallory | 370/394 |
| 2002/0035631 A1* | 3/2002 | Chung et al. | 709/227 |
| 2002/0075870 A1* | 6/2002 | de Azevedo et al. | 370/390 |
| 2002/0152293 A1* | 10/2002 | Hahn et al. | 709/223 |
| 2003/0088679 A1* | 5/2003 | Hori | 709/229 |
| 2003/0145108 A1* | 7/2003 | Joseph et al. | 709/239 |
| 2003/0149771 A1* | 8/2003 | Wookey et al. | 709/227 |
| 2003/0177259 A1* | 9/2003 | Wookey et al. | 709/237 |
| 2004/0199812 A1* | 10/2004 | Earl et al. | 714/13 |

OTHER PUBLICATIONS

Oracle Corporation, "Oracle9*i* Application Server—The Best Application Server for the Oracle9*i* Database," An Oracle Technical White Paper, Feb. 2002, XP-002249177, pp. 1-49.

Laurence Clarke, Oracle Corporation, "Cluster-Aware ODBC and OCI Client Applications for Oracle Fail Safe Solutions," Oct. 2001, An Oracle Technical White Paper, 18 pages.

Microsoft Corporation, "Planning for Reliability and High Availability," Jan. 2001, XP-002255806, 34 pages.

Svend Frolund, et al., "Web e-Transactions," Jul. 12, 2001, published in Internet Computing Conference, Las Vegas, NV, Jun. 25-28, 2001, XP-002255807, pp. 1-10.

Tirthankar Lahiri, et al., "Fast-Start: Quick Fault Recovery in Oracle," ACM SIGMOD 2001 May 21-24, XP-002255808, pp. 593-598.

* cited by examiner

RETRY TECHNIQUE FOR MULTI-TIER NETWORK COMMUNICATION SYSTEMS

FIELD OF THE INVENTION

The present invention relates to managing communications over a network. In particular, embodiments of the invention pertain to a retry technique for multi-tiered network communication systems.

BACKGROUND OF THE INVENTION

Network applications that handle client-server type communications are increasingly becoming more sophisticated. A typical client-server communication involves a client sending a request to a server, and the server returning a response to the client. The server is typically composed of several logical components that handle the client request. Before a response is generated in response to a client request, the client request is often handled in some way by the several logical components of the server.

In a typical application, the server accesses a data source to retrieve information for the client in response to the client request. Each logical component of the server performs functions on the client request before forwarding the client request to the intended data source or to another component. For example, one of the server components may be a JAVA program that performs some computation, queries the data source for select data, performs some more computations, and then returns a result to the client. Other components of the server may handle the communication sequentially, to perform additional computations or make more database queries.

Some of the server components may also handle a response to the client request. For example, in addition to forwarding the client request to the data source, a server component may also forward a response from the data source back to the client. The component may also perform computations and/or make additional queries in response to receiving the response to the client request.

In some configurations, devices that handle the client communication include a load-balancing device and a server machine. The server machine is selected from a group of server machines by the load-balancing device. The selected server machine and load-balancer are used to exchange communications between a client and a data source, such as a database. The server machines forward the client communication from the load-balancing device to the intended database. The database may correspond to a web server or other machine that provides access to information for the client communication.

The devices that handle a client communication combine to provide multiple logical components that process the client communication before it is forwarded to the database. For example, the logical components may be tiered within the server machine(s) in order to distribute processes used for handling the client communication. These tiered components handle the client communications in a sequential manner. The result is that the client communication is sequentially processed by multiple components residing on different machines before being received by the intended database.

Often, a client communication will fail to reach its destination. A client communication may fail because the destination is inaccessible at the time the client communication is signaled to it. A client communication may also fail because one of the components that handles the client communication fails.

The components in many client-server systems are configured to retry failed client communications at the point where the failure is detected. In multi-tiered configurations, the failure detection is propagated to all of the logical components that individually handle the client communication. The result is that multiple components in one server machine individually attempt to retry failed client communications. Furthermore, the multi-tiered configuration causes some components to retry sending the failed client communication multiple times before the failure is reported back to the client. Most of these extra attempts to retry failed client communications are futile.

For example, assume that a server machine provides a communication path that includes a first application 830, a second application 840 and a server application 820, as shown in FIG. 8. The communication path is used to couple a client 810 to a destination. In this example, the destination is a data source 850. A conventional system having no designated retry component would employ second application 840, first application 830 and server application 820 to repeatedly retry a failed client communication. If, for example, the failure occurs when second application 840 attempts to contact data source 850, then the conventional system would provide that second application 840 retries the client communication, then indicates the failure to first application 830. The first application then retries the failed client communication. If data source 850 is still not available to second application 840, then the retry by first application 830 is followed by another retry by second application 840. The server component 820 is notified of the failure after second application 840 retries twice, and first application 830 retries once. If server component 820 retries, second application 840 may retry two more times, and first application 830 may retry again. The result is that client 810 waits a relatively long period before being notified of the failed client communication.

In some existing systems, when a failure occurs in an environment with redundant components, the environment will reconfigure itself such that subsequent requests are sent to another surviving instance. Thus, retrying the request will usually succeed, but another machine and additional resources are needed. For example, if a database server crashes, the environment will reconfigure itself such that subsequent requests will go to another server machine. The selection of another server machine may be made by the load balancer, often after internal components of the original server machine fail.

Based on the foregoing, it is clearly desirable to provide techniques for handling communication failures without the waste that results from multiple components in a communication path performing retry operations in response to a failure that occurs along the communication path.

SUMMARY OF THE INVENTION

Techniques are provided for retrying failed communications between a client and a data source. In an embodiment, a server machine forming a portion of a communication path between a client and a data source is configured to include retry logic on a single internal logical component. The other logical components within the server machine report failed client communications to the component designated for attempting the retry.

According to an embodiment, the retry communications may be managed from a component where the retry logic resides. The retry logic may be configured to selectively identify certain communications as retriable, and others as non-retriable. The retry logic may also be combined with logic to select a new communication path for the failed client communication.

Other embodiments incorporate retry techniques and management of retry communications from another device in the client communication's path. For example, the retry technique may be implemented with a load-balancing device, or with the client.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
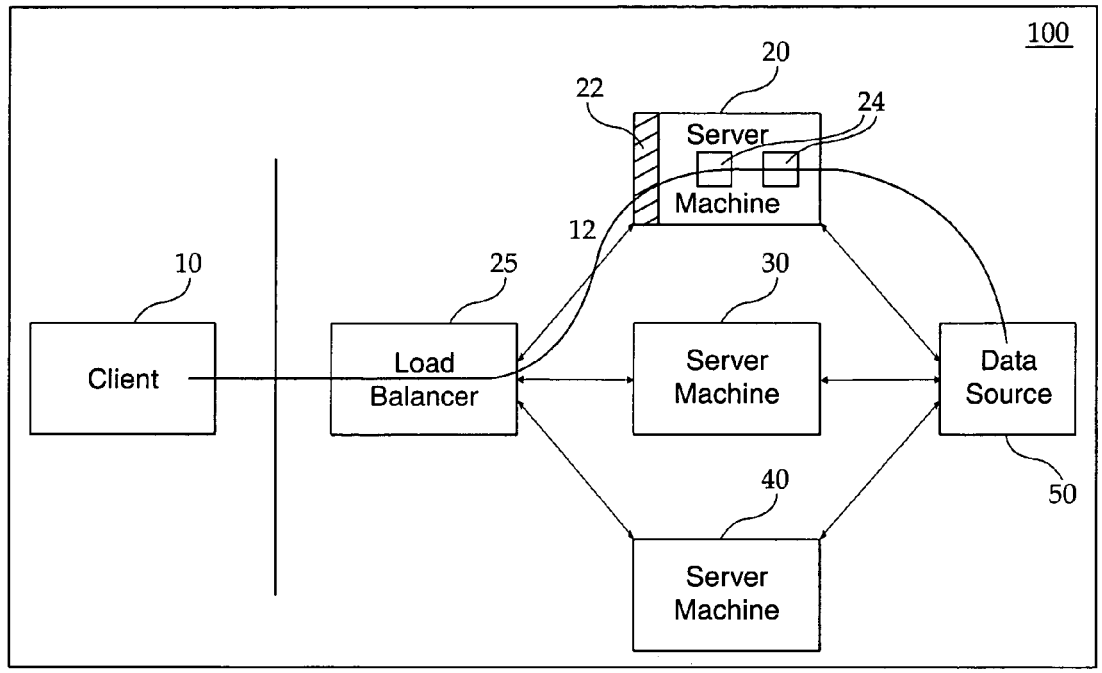
FIG. 1 illustrates a system having a designated retry component for communications signaled between clients and a data source.

A method and apparatus for accessing data sources is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A. Overview

According to an embodiment, a retry point is designated for sequential components that form a communication path between a client and a data source. The designated retry component is provided on one of the components in the communication path. If a communication from the client to the data source fails to reach its destination, the designated retry component is the only component that retries sending the client communication to the destination. The other components do not retry sending the communication to the destination, but rather inform the retry component that the communication failed to reach the destination.

The retry component may be needed when the client communication fails on one of the components in its communication path. In addition, the retry component may be needed when one of the components in the communication path drops, or otherwise fails to process the client communication.

The destination may be a data source. Examples of data sources are databases and directories. In one embodiment, a database system comprising a database server and database may comprise the data source.

A data source may include network servers, data depositories such as directory and database devices, and other storage devices. In Internet applications, the data source 50 is typically a web server, or a web-enabled data depository.

Logical components include programs, applications, software, coded firmware or hardware, configured to process client communications in order to perform specific tasks. A retry component is a logical component configured to retry sending client communications towards the data source. The retry component may send communications towards the data source by sending the communication to intermediary components that form portions of a communication path to the data source. The retry component may retry sending a client communication using the original communication path, or its equivalent. Alternatively, the retry component may be equipped to select another communication path formed by different intermediary components, on devices external to the retry component. The retry component may also attempt to access another data source, if an original data source is what failed in the communication path.

A specific example of a retry component is a logical server component on a server machine that serves and dispatches incoming requests for the server machine. Other components that act as an interface for server machines are also suitable for implementing retry logic.

In an embodiment, a plurality of logical components are sequentially coupled to forward a communication from a client to a data source. One of the components is designated as a retry component for the components of the communication path. The retry component retries sending the first communication towards the data source if the client communication is detected as failing to access the data source. The other components in the communication path are designated to forward an indication that the communication failed to the retry component. When one component in the communication path fails, the previous component (i.e. the one that forwarded the request to the failed component) forwards an indication to the retry component. Any component that is not the retry component, but is in the communication path, receives the indication, and must likewise forward the indication towards the retry component. In this way, each of the other components signals the indication towards the retry component without resending the first communication towards the data source.

A communication path comprises logical components that sequentially combine to forward a client communication to a data source. The logical components of the communication path may reside on different devices. A retry point is a location along the communication path where logic resides to retry sending failed client communications.

Retry logic may determine whether a failed client communication is retriable before attempting to resend the client communication towards the data source. Certain types of communications, or specific requests, may be designated as not retriable. These designations may be incorporated into the retry logic.

Retry logic may also determine alternative communication paths before resending the failed client communication. The alternative communication paths may reside outside of the device where components of the previous communication path reside. The retry component may send the request along whatever path so as to bypass the failed communication. For example, the retry logic may consider whether the communication needs to be sent outside of the device where the failure occurred. In making this determination, the retry component may also determine whether a particular request is retriable.

In another embodiment, a retry point is designated on a first communication path between a client and a data source. The first communication path includes a plurality of logical components that sequentially receive and forward a client communication to the data source. The retry point forms a portion of the communication path. If one of the components in the path of the client communication fails, or is otherwise unable to reach its destination, then the retry component is notified of the failure.

For example, in one embodiment, if the client communication fails to access the data source along a portion of the communication path between the retry point and the data source, then the retry point is signaled an indication that the client communication failed to access the data source by one or more of the other components in the communication path.

According to an embodiment, retry logic may make a determination as to whether the client communication is retriable. The retry logic may resend the client communication only if the client request is determined to be retriable.

Using the techniques described herein, a system may use the single designated retry component to perform an optimal number of retries. In many cases, a single retry may be sufficient to determine if the data source can be accessed. In contrast, conventional systems cannot be set to perform an optimal number of retries, especially only one retry, because each component will typically automatically retry a client communication upon detecting its failure. Thus, even if each component is configured to perform a single retry, the number of retries that are actually performed can be at least as great as the number of components that are performing the retries.

Still further, embodiments of the invention permit retry logic to be configured to make other determinations and decisions. In particular, a retry component may be configured to determine whether a particular client communication is retriable, and to identify a new communication path if necessary. Conventional systems have too many components that retry failed client communications, making configurations of retry logic difficult and less efficient.

In another implementation, a retry component makes a determination before retrying to send the client communication. The determination may correspond to a number for how many retries were previously attempted for that client communication. The retry component may retry sending the client communication if the number of previous attempts is less than a maximum threshold of retries.

B. System Description With Retry Technique

FIG. 1 illustrates a system 100 having a designated retry component for communications signaled between clients and a data source. Select components of system 100 combine sequentially to form one or more communication paths between a client 10 and a data source 50. A retry component marks a designated location on a selected communication path where a failed client communication is permitted to be resent to access data source 50.

For purpose of explanation, system 100 is described in the context of client 10 requesting information from data source 50. It is, however, possible for system 100 to be employed in a broader context of processing and forwarding communications from a source computer to a destination computer, and for processing and forwarding a response from the destination computer to the source computer. Therefore, reference to data source 50 as the destination for the client communication is made to illustrate one application where the destination is, for example, a database system.

The system 100 may provide multiple communication paths between client 10 and data source 50. Each communication path includes only one component, or alternatively only select components forming a portion of the communication path on any one machine, configured to retry sending failed client communications back towards the data source. The other components of each communication path are configured to refer failed client communications to the retry component(s).

Among other advantages, embodiments of the invention avoid proliferating futile retries of failed client communications. By selecting one component for performing retries, the number of retries performed by system 100 is reduced. As a result, the delay in reporting failures back to the client 10 may be significantly reduced in comparison to other systems that are not particular in use of retry logic, especially when compared to worst-case scenarios of these other systems where several components end up making retry requests.

Another advantage provided by an embodiment is that retry logic may be implemented in a system with relative ease and little support. For example, retry logic can be implemented in a single logical component of a server machine. Additional components can be added to the environment over time with the retry logic already in place, without substantial configuration to the environment.

In addition, centralizing retry logic into one component facilitates management of the retry communications. Retry logic may be configured to preclude retries for certain client communications that are previously designated as being unretriable. For example, secure communications may previously be designated as being unretriable. A determination as to whether a request is retriable may be made based on the request type. For example, requests that will return the same reply no matter when made are retriable.

In contrast, other conventional systems allow for each component of a communication path to resend a failed client communication. This often results in extended delays because one failed component can cause several components upstream in the communication path to retry sending the client communication before the client is finally notified that the previous communication has failed.

In a configuration shown by FIG. 1, system 100 includes a load-balancing device 25, a first server machine 20, second server machine 30 and third server machine 40. The combination of server machines may correspond to a server farm for processing client communications before forwarding the client communications to a destination. The load-balancing device 25 selects one of the server machines to form a communication path between client 10 and data source 50.

The network 15 may correspond to a wide-area network such as the Internet. The client 10 may be a terminal configured to communicate over network 15. A typical example of a client 10 and network 15 include a desktop computer with a web browser to access the Internet.

The load-balancing device 25 intercepts a client communication signaled from client 10 to data source 50. The client communication may correspond to a request for data. The client communication may alternatively request to write data, modify existing data, or delete existing data within data source 50. In response to receiving the client communication, load-balancing device 25 selects one of the server machines to access data source 50, depending on available resources of each server machine. Each server machine 20, 30, 40 includes a plurality of logical components that sequentially process the client communication. In an example provided by FIG. 1, load-balancing device 25 selects first server machine 20, so that a communication path 12 is formed by client 10, load-balancing device 25, first server machine 20, and data source 50. A plurality of logical components (see FIG. 2) within first server machine 20 sequentially combine to form part of communication path 12.

According to an embodiment, each of the server machines 20, 30, 40 is configured with retry logic for resending failed client communications from a designated logical component within that server machine. FIG. 1 illustrates first server machine 20 configured to include a retry component 22. In one implementation, retry component 22 communicates directly with load-balancing device 25. For example, retry component 22 may be implemented on a logical server component, which dispatches the client communication directly from load-balancing device 25. A plurality of other components 24 of first server machine 20 are positioned subsequent to retry component 22 along communication path 12.

In this configuration, the components of first server machine 20 which sequentially combine to form communication path 12 are distributed so that the first component in the sequence is the only component that retries failed client communications. For failed client communications, other components 24 in first server machine 20 return an indication to the retry component 22 that the client communication failed. The components 24 do not attempt to resend the failed client communication.

Other embodiments provide that retry logic may be provided elsewhere along one of the communication paths between client 10 and data source 50. In one implementation, load-balancing device 25 includes logic to serve as retry component 22. In another implementation, client 10 includes logic to act as the retry component 22. By moving the retry component 22 away from data source 50, the number of components on communication path 12 that may retry sending failed client communications back towards data source 50 is reduced.

Figure 2:
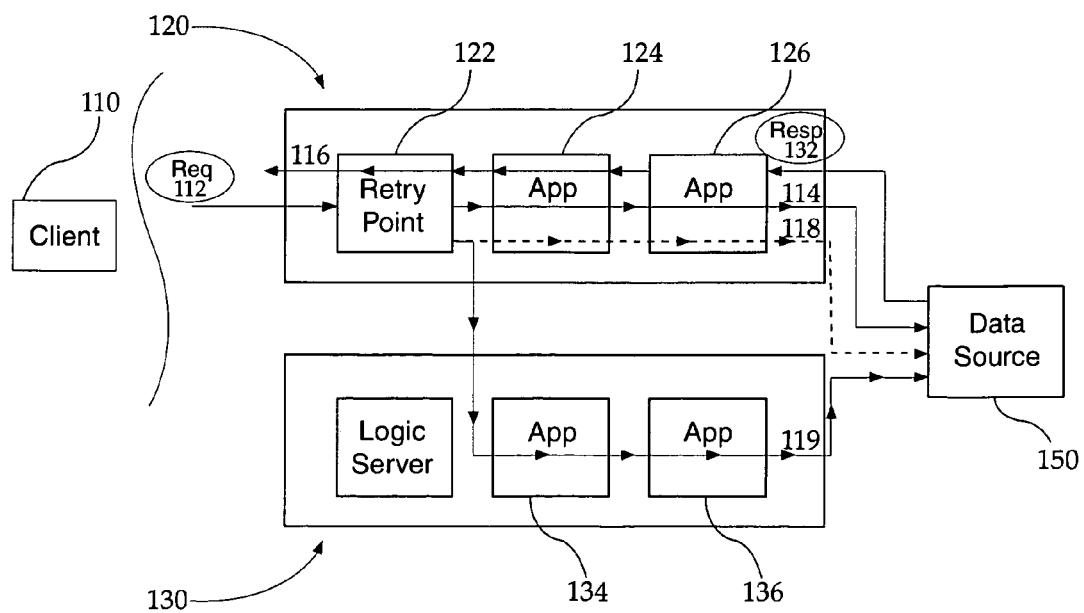
FIG. 2 is a block diagram to illustrate operations of a server machine configured to include retry logic.

FIG. 2 is a block diagram to illustrate operations of a server machine configured to include retry logic. The server machine includes a plurality of logical components that process a communication to the server machine in a sequential manner.

In an embodiment, first server machine 120 includes processes a client communication 112 using multiple, tiered components. The components are aligned to process the client communication 112 according to a sequence 114. At least one of the components in sequence 114 is designated as being the retry point 122.

In an embodiment, retry component 122 corresponds to the component that receives the client communication 112 first in sequence 114. The other components used in sequence 114 include a first application 124 and a second application 126. The first application 124 receives client communication 112 from retry point 122. The second application receives client communication 112 from first component 124. The second application 126 forwards client communication 112 to data source 150. The server machine 120 attempts to resend failed client communications 112 back to the data source 150 only at the retry point 122.

In an embodiment, retry point 122 corresponds to a server component of first server machine 120 configured to include retry logic. The first application 124 may correspond to a presentation layer for presenting information from data source 150 to client 110. The second application 126 may correspond to business logic or other application for specific types of network communications. For example, in a JAVA environment, first application 124 is a JAVA Servlet Engine (JSERVE) application to present JAVA enabled data from data source 150. The second application 126 may correspond to EJB server application, carrying logic for completing business applications. Each application may process and modify client communication 112 independently.

The data source 150 may signal back a response 132 to the client using a reverse sequence 116. In the reverse sequence 116, response 132 is signaled by data source 150 to second application 126, which then forwards the response to first application 124 and then to retry point 122. The response 132 is then forwarded back to the client 110.

On occasions, one of the components that handles client communication 112 fails. The failure may be caused by any component in the sequence 114, or alternatively by data source 150. For example, data source 150 may become unavailable or too congested to process client communication 112. The failure then occurs when second application 126 attempts to signal client communication 112 to data source 150. The component at the point of the failed client communication may signal an indication that client communication 112 failed using reverse sequence 116. The retry point 122 may retry sending the client communication 112 back to data source 150 in response to receiving the indication that client communication 112 failed.

The retry point 122 implements a retry sequence when resending the failed client communication 112. In one embodiment, a first retry sequence 118 includes the same components and arrangements as the sequence 114. In another embodiment, a second retry sequence 119 includes components of another server machine 130. For example, second retry sequence 119 may provide that retry point 122 signals client communication 112 to a first application 134 of a second server machine 130. The first application 134 may forward the client communication 112 to a second application 136 on that server machine. The first and second components 134 and 136 of second server machine 130 may perform similar or identical functions as the first and second applications 124 and 126 of first server machine 120.

Still further, if server machine 120 has multiple processes for processing and forwarding client communications, other embodiments may provide that retry point 122 selects another one of the processes on the same server machine 120.

In an embodiment, each component maintains a topology map of the components in its subsequent tiers. Then, each component can select a component that is alive. The retry point 122 may use the topology map to determine the status of components on other server machines, or on the same machine. The retry point 122 may be equipped with intelligence to make a selection of a suitable path for sending the retry, using information from the topology map.

Still further, other embodiments may provide other retry sequences. For example, if one of the components in sequence 114 is detected to have failed, the component at retry point 122 may select to bypass that component when retrying to send the failed client communication 112.

The server component 122 may include logic to select the retry sequence. For example, if client communication 112 is secure, server component 122 may only use a retry sequence that is internal to first server machine 120. Alternatively, server component 122 may select a retry component based on performance. For example, server component 122 may determine that retries should be kept on the same server machine in order to use a cache that has a useful data set for the particular client request.

Figure 3:
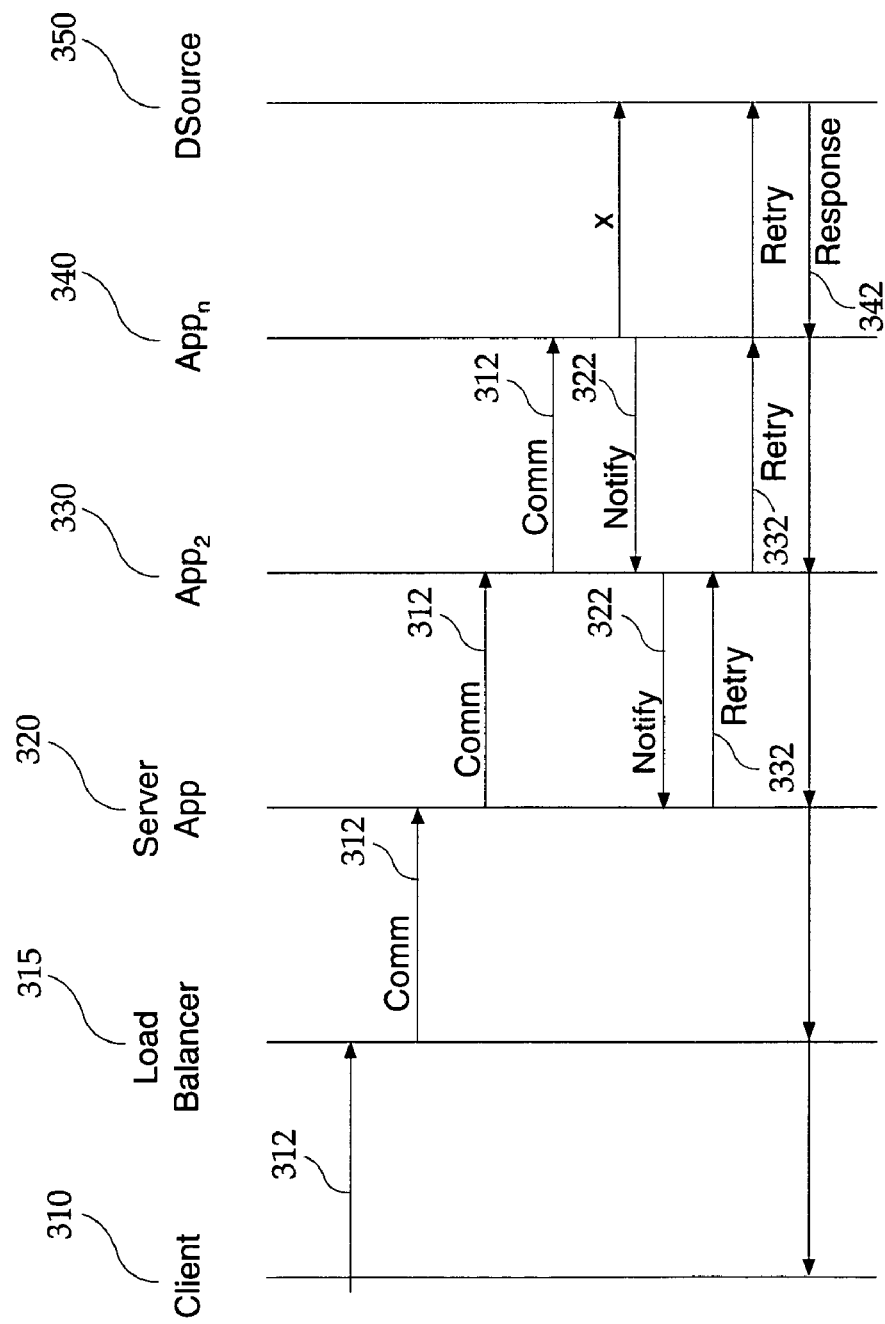
FIG. 3 illustrates a sequence diagram for implementing retry logic in the communication path between a client and a data source.

FIG. 3 illustrates a sequence diagram for implementing retry logic in the communication path between client 310 and data source 350. The communication path includes load-balancing device 315, a server component 320, a first application 330, a second application 340 and a data source 350. FIG. 3 assumes that the server component 320 includes retry logic. In addition, FIG. 3 assumes the retry logic does not select a new communication path to resend a failed client communication.

As mentioned above, if the system of FIG. 3 uses conventional retry techniques, it can result in a proliferation of futile retries. FIG. 3 shall now be used to illustrate the operation of a system configured to retry failed client communications from a designated component, thereby reducing delays that are otherwise produced by conventional systems. By using only the designated retry component 320, embodiments of the invention can reduce the number of retries to a single attempt.

Using the techniques described herein, the client signals a client communication 312 that is delivered to load-balancing device 315 across a network. The load-balancing device 315 forwards client communication 312 to server component 320. The server component 320 may reside on a server machine selected by load-balancing device 315. The client communication 312 is forwarded by server component 320, first application 330, and second application 340 to data source 350.

If, for example, second application 340 fails to access data source 350, second application 340 signals a notification 322 of the failure to first application 330. The first application 330 forwards the notification 322 to server component 320.

In response to receiving the notification 322 from the first application 330, server component 320 may signal a retry 332 back to first application 330. The retry 332 includes contents of client communication 312. The retry 332 is forwarded to first application 330, second application 340, and then data source 350.

If the retry 332 is successful, a response 342 from data source 350 is returned to client 310. The response 342 maybe forwarded to client 310 using the sequence of second application 340, first application 330, server component 320, load-balancing device 315, and client 310.

C. Methods for Implementing Retry Technique

Figure 4:
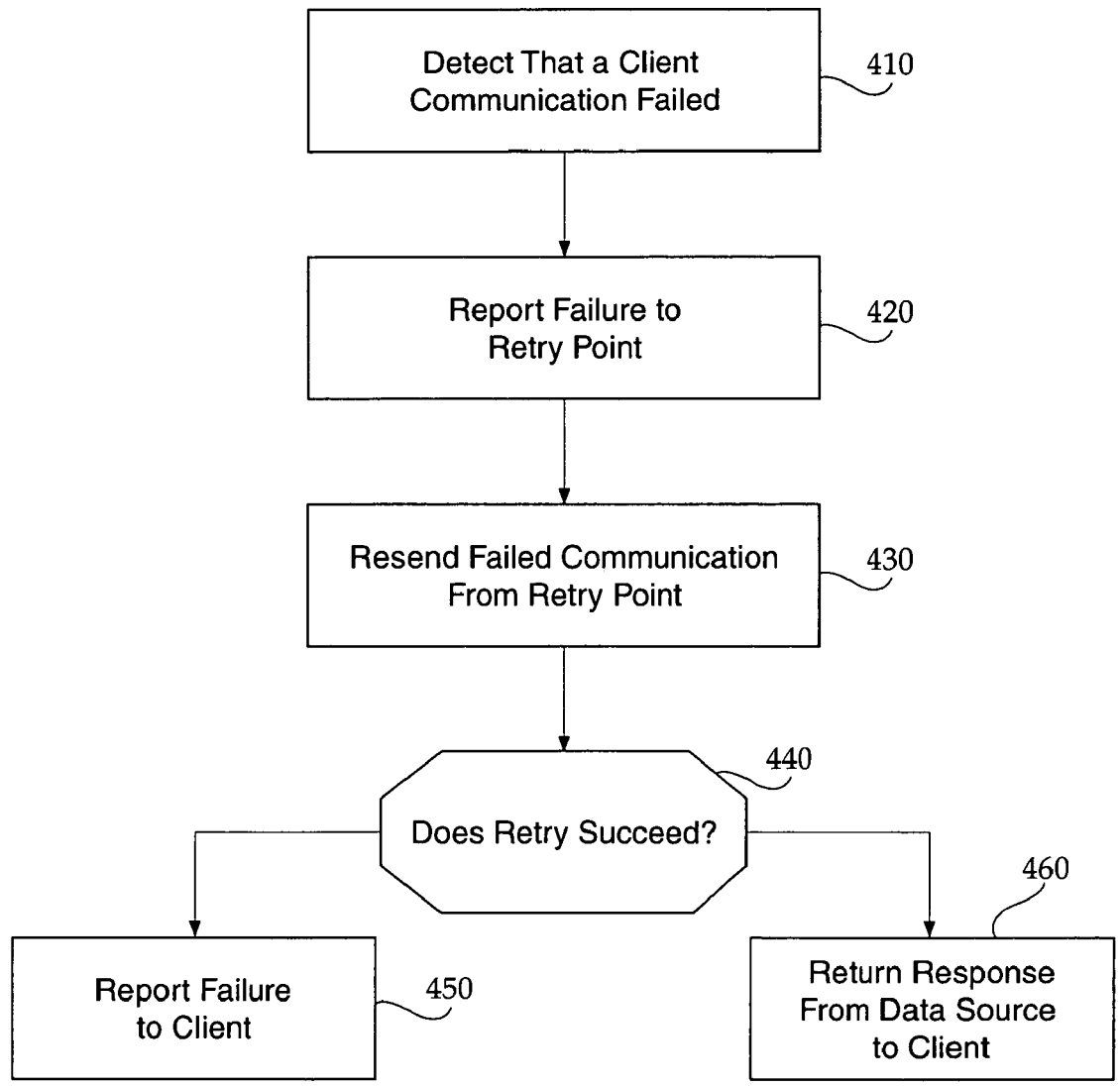
FIG. 4 illustrates a method for implementing retry logic for a server machine used to couple a client to a data source.

FIG. 4 illustrates a method for implementing retry logic for a server machine used to couple a client to a data source. A method such as described by FIG. 4 may be implemented on components and systems such as described with FIG. 2.

In step 410, a failed client communication is detected. The failed client communication may be detected at the point of failure. For example, if second application 126 (FIG. 2) fails to access data source 150, the point of detection is at second application 126.

In step 420, the failed client communication is reported to the retry point. The component that detects the failure may report the failure back to the adjacent component in the sequence of the communication path. One or more intermediate components combine to sequentially forward the client communication from the component that detects the failure to the retry point. Alternatively, the component that detects the failed client communication may be configured to report the failure to the retry point directly, so as to bypass intermediate components of the communication path.

In step 430, the failed client communication is resent to the data source from the retry point. This step may be performed automatically, in response to the retry point receiving a report that the client communication failed.

In step 440, a determination is made as whether the retry succeeded. According to an embodiment, if the retry fails, the failure is reported to the client in step 450. Therefore, the retry point may be configured to attempt only one retry.

If the retry succeeds, step 460 provides that the response from the data source is reported back to the client. For example, if the client communication corresponds to a read operation, the response back to the client contains data and other information to enable the browser of the client to render information corresponding to the client's request.

In contrast to other retry techniques, one advantage provided by an embodiment such as described with FIG. 4 is that the point where a failed client communication is detected and acted upon is localized to a select component in the client communication's path. The point where retry action takes place is not shared indiscriminately with multiple components in the communication path of the client communication. While multiple logical components combine to form the communication path of the client communication, an embodiment provides that only one component acts upon the failure. Such a method preserves resources in a system where hundreds or thousands of client communications are handled concurrently.

In addition, the retry component may be the only place in the client communication path where the failure is detected. Alternatively, the point of failure may be detected in another one of the components in the client communication path. Still further, the retry component may retry failed client communications that are detected by an external monitor.

Furthermore, a system configured to implement a method such as described with FIG. 4 may also be configurable to implement other features with the retry logic. An example of another kind of technique is described with FIG. 5

Figure 5:
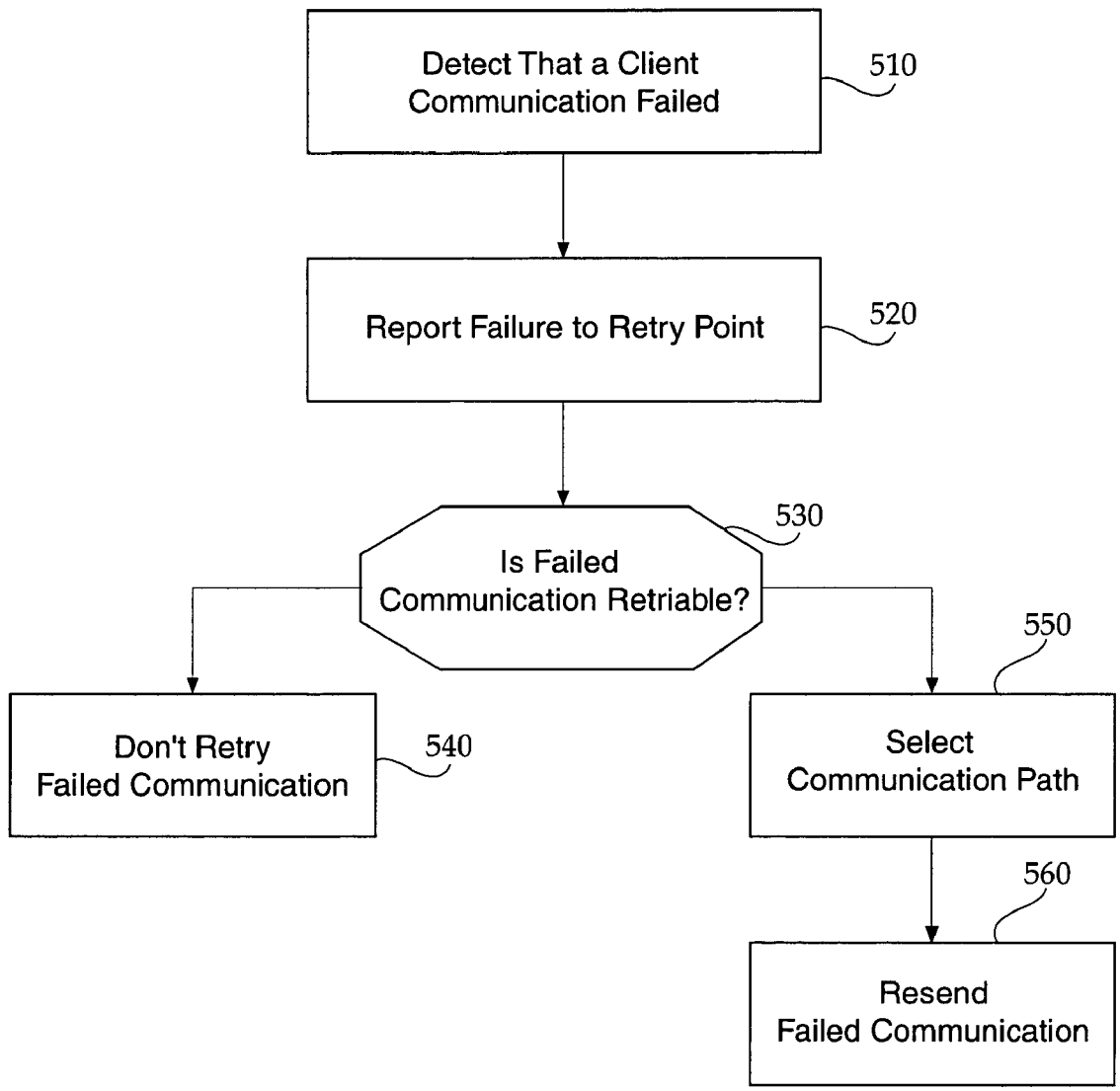
FIG. 5 illustrates a method for implementing retry logic on a system for coupling a client to a data source.

FIG. 5 illustrates a method for implementing retry logic on a system for coupling a client to a data source. Reference to numerals in FIG. 2 are intended to illustrate exemplary components for use with an embodiment. A method as described in FIG. 5 may be implemented on one or more logical components forming a communication path between the client 110 and a data source 150.

In step 510, a failed client communication is detected by one of the logical components that carries the client communication to the data source. The logical component may correspond to a component that is subsequent in the sequence 114 to retry point 122. The client communication may be detected as failing if one of the logical components fails to access the next immediate component in the sequence 114. The client communication may also be detected as failing if the last logical component in the sequence 114 fails to access the data source 150.

In step 520, an indication is signaled to the retry point that the client communication failed. The indication may be carried back to the retry component 122 in a reverse sequence. Alternatively, the component that detects the failed client communication may signal the indication to the retry point 122 directly, bypassing intermediate components that handled the client communication when it was originally forwarded from retry point 122.

In step 530, a determination is made as to whether the failed client communication is retriable. In an embodiment, the determination is made at the retry point 122. For example, retry point 122 may correspond to a server component of server machine 120, configured with retry logic that includes intelligence to determine whether the failed client communication is retriable.

To identify whether the client communication is retriable, retry point 122 may identify information about the client communication. This information may be referenced in a table or other data structure so as to indicate whether the failed client communication should be retried. The retry point 122 may determine that certain types of communications are not retriable. For example, secure communications may be determined to not be retriable. Alternatively, the type of communication may indicate whether the request is retriable. For instance, requests for static data may be predetermined to be retriable. Still further, retry point 122 may be configured to identify certain sources and/or destinations of the client communications as not being retriable.

If the determination in step 530 is that the failed client communication is not retriable, step 540 provides that the client is notified the client communication failed. The retry point 122 may forward the indication that the client communication failed to client 110.

In an embodiment, if the determination in step 530 is that the failed client communication is retriable, step 550 provides that the retry point 122 selects a communication path to retry sending the failed client communication. For example, retry point 122 may access another server machine and use a new communication path that incorporates the components of the other server machine. Alternatively, retry point 122 may determine to use the previous communication path if, for example, the fault is determined to be at data source 150.

Once the communication path is selected, retry component 122 resends the failed client communication back towards data source 150. The retry point 122 forwards the client communication by signaling the client communication to the next subsequent component in the sequence of the selected communication path.

In applications such as web-based communications, the content of the request may indicate whether the request is retriable. For example, a URL may contain a variable or other wording that indicates whether the request should be retriable.

Figure 6:
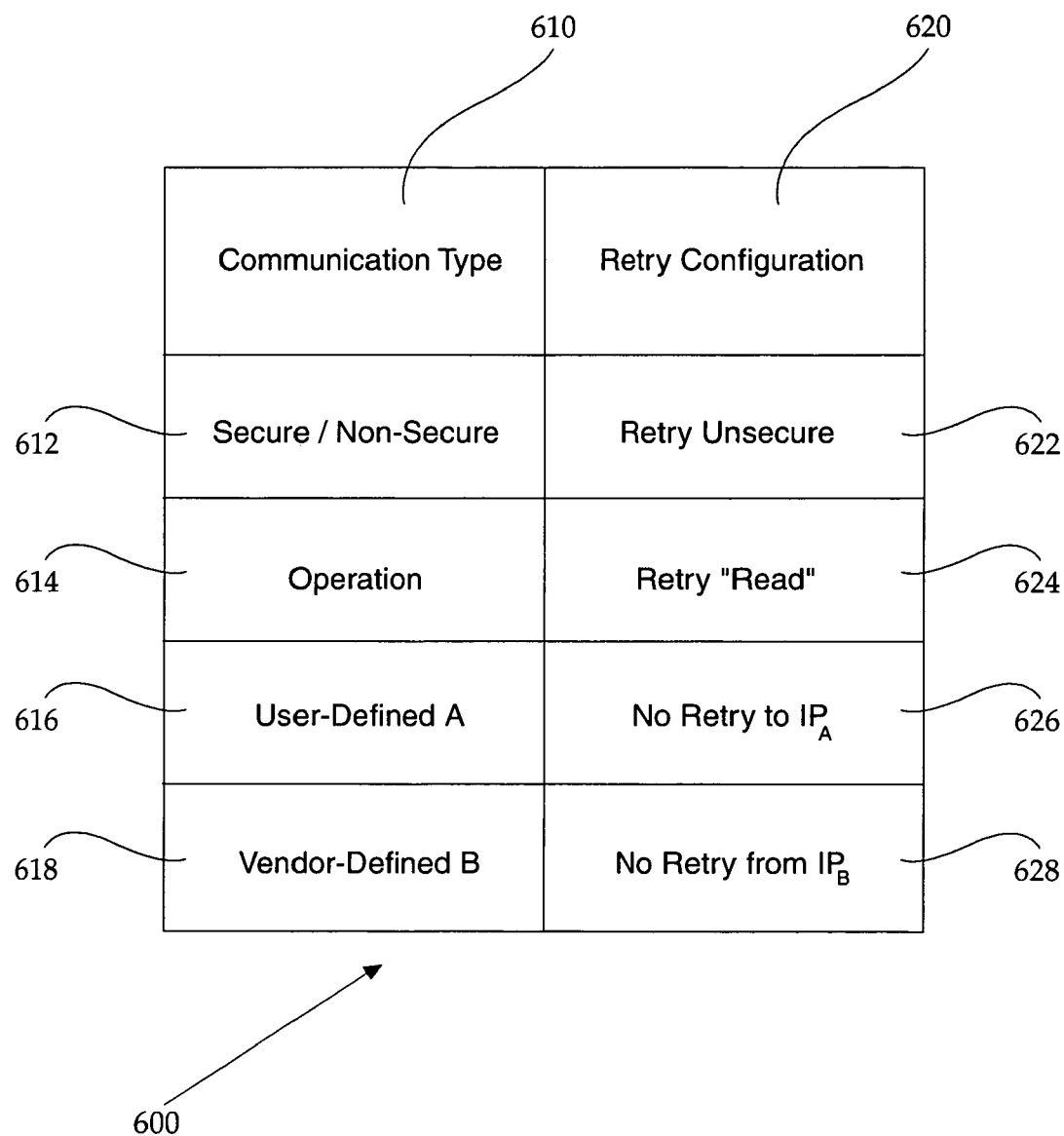
FIG. 6 illustrates a data structure that can be implemented with retry logic to determine whether certain failed communications are retriable.

FIG. 6 illustrates a data structure 600 that can be implemented with retry logic to determine whether certain failed client communications are retriable. The data structure 500 matches one or more parameters identified from the client communication with a corresponding value to determine whether that client communication is retriable. The one or more parameters identified from the client communication belong to a set of parameter characteristics 610. The corresponding value for each parameter belongs to a set of parameter values 620.

In an example provided, the parameters characteristics 610 include a security parameter 612 to identify whether the client communication is secure, an operation parameter 614 to identify what operation (read, write, delete etc.) is specified by the client communication, one or more user-defined parameters 616, and/or one or more vendor-specified parameters 618. The user-defined parameter maybe defined or configured by the user of the client. The vendor-defined parameter may be defined or configured by the vendor of the server machines. For example, in server farms, vendors provide or configure one or more logical applications on the server machines.

The parameter values 620 include the following. A value 622 of the security parameter may require failed client communications to be retried for unsecure communications, but not secure communications. A value 624 of the operation parameter 614 may specify that retry may be performed for client communications that specify a read operation, but not a write or delete operation. A value 626 may be configured to match the user-defined parameter 616. As an example, value 626 may preclude retrying failed client communications if the destination of the client communication is a particular network address IP(a). A value 628 may be configured to match the vendor-defined parameter 618. For example, a vendor-defined parameter may be provided that precludes retrying failed client communications for certain users of the clients, having an ID(a).

More sophisticated data structures and techniques for identifying retriable client communications are possible. In an embodiment, the data structure 600 may be modified to identify client communications that are retriable with new communication paths that are outside of the retry point. For example, secure client communications may be retriable, but only if signaled using the components of the same server machine.

In one specific application, table 600 may correspond to a pattern of uniform resource locators (URLs). If, for example, a URL pattern in a Hypertext Transfer Protocol (HTTP) request sent from a web browser contains a particular pattern, that pattern may be matched to specific retry functions or instructions. For example, requests specifying or including a pattern such as http://website/documents/reads/* may be designated as retriable. But a request specifying a pattern such as http://website/documents/updates/* may be designated as not being retriable. In the latter case, the request may not be retriable because requests to update data inherently mean that the data being accessed is dynamic, not static.

E. Alternative Configurations

While embodiments described herein describe only a single retry component for a communication path between client 10 and data source 50, other embodiments may provide for multiple retry components. In particular, multiple retry components may be strategically positioned on the communication paths between client 10 and data source 50. For example, one implementation may provide for server machine 20 and load-balancing device 25 to each include a retry component. The components on server machine 20 are configured to retry sending a failed client communication from the server machine's retry component if the client communication fails between the server machine and the data source. Likewise, components on load-balancing device 25 are configured to retry sending the client communication from the load-balancing device's retry component if the client communication fails on one of the load-balancing device's logical components.

The embodiments described herein focus on communications from a client to a data source. However, the techniques described herein are not limited to that context. Rather, they may be employed in any scenario in which a sender is sending a message to an intended recipient, where the message has to pass through multiple intermediary components. For example, the message may be a response sent by a data source to a client in response to a request from the client. The request may also be from a client to server that provides a service, but is that not the source of data that can be retrieved by the client.

F. Hardware Description

Figure 7:
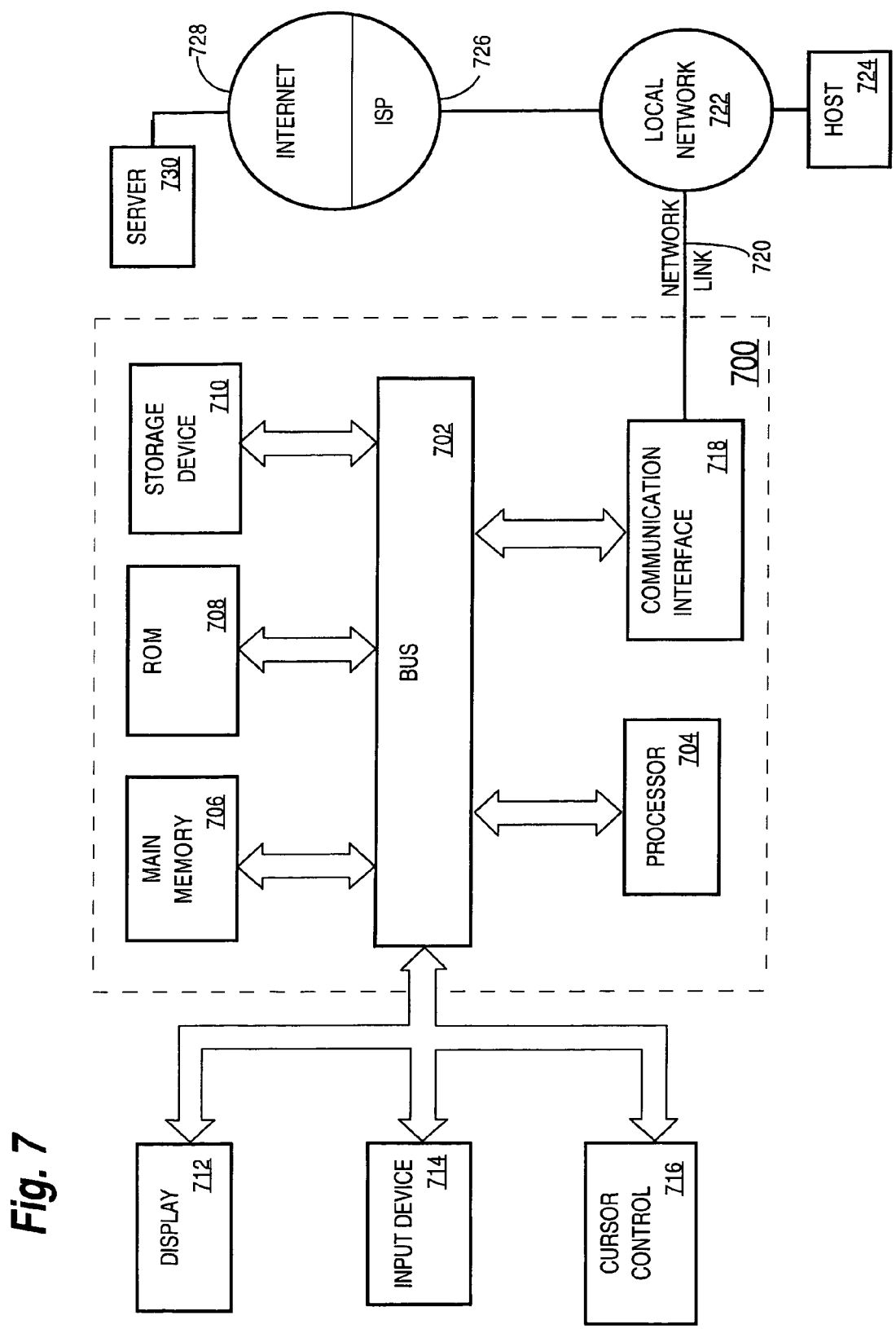
FIG. 7 is a block diagram that illustrates a computer system upon which an embodiment of the invention may be implemented.
Figure 8:
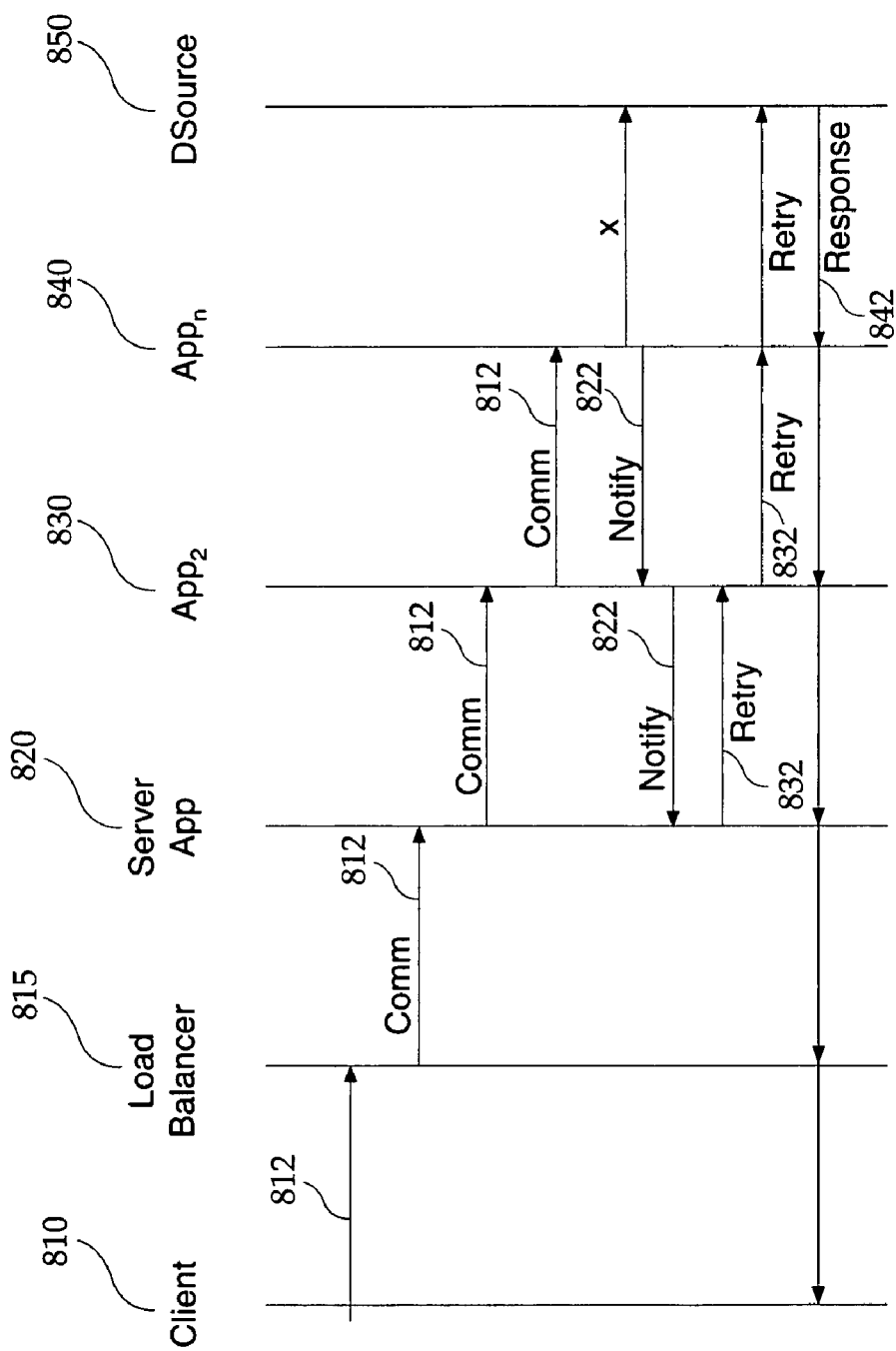
FIG. 8 illustrates a prior art system for retrying failed client communications to a server.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system for managing communications between a sender and an intended recipient, the system comprising:

a plurality of logical components coupled in a sequence to sequentially forward a sender communication from the sender to the intended recipient;

a retry component, in the plurality of logical components, that is designated to retry sending the sender communication to the intended recipient if the sender communication fails to reach the intended recipient;

wherein the retry component is the only component of the plurality of logical components that is designated to retry sending the sender communication to the intended recipient; and multiple components, in the plurality of logical components, that respond to the sender communication failing by:
   (a) constructing a message which indicates that the sender communication failed, and
   (b) sending the message to the retry component without themselves retrying to send the sender communication to die intended recipient;

wherein at least one of the multiple components is configured to respond to the sender communication failing by sending the message directly to the retry component, wherein sending the message directly to the retry component comprises bypassing at least one other component of the multiple components;

wherein at least one of the multiple components is a component that is not positioned within said sequence to receive communications directly from the retry component.

2. The system of claim 1 wherein the sender is a client, the intended recipient is a data source, and the sender communication is a request for data that is managed by the data source, wherein the data source is a database system comprising a database server and a database.

3. The system of claim 1, wherein the retry component precedes the multiple components in a communication path from the sender to time intended recipient.

4. The system of claim 1, wherein the retry component is provided as part of an interface oh server machine, the inter face being configured to process requests to the server machine from other devices.

5. The system of claim 1, wherein the retry component is a logical server component of a server machine that sends requests to the intended recipient.

6. The system of claim 1, wherein at least the multiple components in the plurality of logical components reside on a first server machine, and wherein the retry component is configured to retry sending the sender communication to the intended recipient using components of a second server machine.

7. The system of claim 1, wherein the retry component accesses a topology map to determine which of the multiple components are functioning properly.

8. The system of claim 1, wherein the retry component determines whether the sender communication is reliable before resending the sender communication.

9. The system of claim 8, wherein the retry component determines whether the sender communication is retriable based, at least in part, on a characteristic, of the sender communication.

10. The system of claim 8, wherein the retry component and the multiple components reside on a server machine, and wherein the retry component is configured to contact other server machines to resend the sender communication if any of the multiple components indicate that the sender communication failed to react the intended recipient.

11. The system of claim 8, wherein the retry component determines whether the sender communication is secured in determining whether the sender communication is retriable.

12. The system of claim 8, wherein the retry component identifies an identity of the sender in determining whether the sender communication is retriable.

13. The system of claim 8, wherein the retry component determines whether the sender communication is retriable based on an identity of the intended recipient.

14. The system of claim 1, wherein the retry component is the only component that is configured to retry sending the sender communication to the intended recipient if one or more of the multiple components indicate that the sender communication failed to reach the intended recipient.

15. The system of claim 8, wherein the retry component resides an the sender and communicates with the multiple components across a wide area network.

16. The system of claim 1, wherein the retry component resides in a server machine, and wherein the single retry component identifies at least one other alternative component in the server machine, and retries sending the sender communication to the intended recipient by forwarding the sender communication to the at least one other alternative component.

17. The system of claim 1, wherein before retrying to send the sender communication, the retry component determines a number for how many retries were previously attempted for that sender communication, and then only retries sending the sender communication if the number is lees than a maximum threshold of retries.

18. The system of claim 1, wherein the retry component uses a resource identifier of a resource being requested by thy sender communication to determine if the sender communication is retriable prior to the retry component resending the sender communication towards the intended recipient.

19. The system of claim 18, wherein the retry component uses a uniform resource locator as the resource identifier of the resource being requested by the sender communication.

20. The system of claim 1, wherein said component is a particular component that is positioned at least one component away from the retry component within said sequence.

21. A method for managing network communication, the method comprising performing a machine-executed operation involving instructions, wherein the machine-executed operation is at least one of:
   A) sending said instructions over transmission media;
   B) receiving said instructions over transmission media;
   C) storing said instructions onto a machine-readable storage medium; and
   D) executing said instructions;

wherein said instructions are instructions which, when executed by one or more processors, cause the one or more processors to perform the steps of:

designating a retry point on a first communication path between a sender and an intended recipient, the first communication path comprising a plurality of logical components, coupled in a sequence, that sequentially receive and forward a sender communication from the sender to the intended recipient, the retry point forming a portion of the first communication path;

if the sender communication fails to reach the intended recipient along a portion of the first communication path beyond the retry point, then a logical component of said plurality of logical components:
   (a) constructing a message which indicates that the sender communication failed to reach the intended recipient, and
   (b) sending the message to the retry point;

wherein sending the message to the retry point comprises sending the message directly to the retry point, wherein sending the message directly to the retry point comprises bypassing at least one other component of the plurality of logical components; and resending the sender communication to the intended recipient only from the retry point;

wherein the retry point comprises all components of the plurality of logical components that are designated to resend the sender communication to the intended recipient;

wherein said logical component is not positioned within said sequence to receive communication directly from the retry point.

22. The method of claim 21, wherein sending to the retry point the message which indicates that the sender communication failed to reach the intended recipient is performed in response to detecting that the sender communication failed to reach to intended recipient.

23. The method of claim 22, wherein detecting that the sender communication failed to reach the intended recipient includes detecting that the intended recipient is unavailable.

24. The method of claim 22, wherein detecting that the sender communication failed to reach the intended recipient includes detecting that a logical component in the first communication path failed.

25. The method of claim 21, wherein designing the retry point includes designating a logical server component to execute retry logic.

26. The method of claim 21, wherein said instructions further include instructions for selecting a new communication path for the sender communication they detecting that the sender communication failed.

27. The method of claim 26, wherein selecting a new communication path includes using logic at the retry point to identify an available communication path for reaching the intended recipient.

28. The method of claim 21, wherein designing the retry point includes selecting a portion of the logical components forming the first communication path as the retry point, the portion of the logical components comprising at least two logical components.

29. The method of claim 28, wherein selecting a portion of the logical components includes selecting the portion of the logical components from a load-balancing device that spreads workload among a plurality of server machines, the portion of the logical components residing on one of the plurality of server machines.

30. The method of claim 21, wherein said instructions further include instructions for:

determining whether the sender communication is retriable; and resending the sender communication only if the sender communication is retriable.

31. The method of claim 30, wherein determining whether the sender communication is retriable includes determining an identity of the sender, and resending the sender communication if the identity of the sender is designated to permit resending the sender communication.

32. The method of claim 30, wherein determining whether the sender communication is retriable includes determining an identity of the intended recipient, and resending the sender communication if the identity of the intended recipient is designated to permit resending the sender communication.

33. The method of claim 30, wherein determining whether the sender communication is retriable includes determining that the sender communication is not retriable if the sender communication is secured.

34. The method of claim 30, wherein determining whether the sender communication is retriable includes determining a number for how many retries were previously attempted for the sender communication, and then retrying the sender communication only if the number is less than a maximum threshold of retries.

35. The method of claim 30, wherein determining whether the sender communication is retriable includes referencing a characteristic of the sender communication to a corresponding indication of whether the sender communication is retriable.

36. The method of claim 30, wherein designating the retry point on the first communication path between the sender and the intended recipient includes selecting a logical server component corresponding to the sender as the retry point.

37. The method of claim 30, wherein resending the sender communication to access the intended recipient includes resending the sender communication to the intended recipient using a different communication path.

38. The method of claim 37, wherein using the different communication path includes accessing a communication device external to the first communication path to forward the sender communication for the intended recipient.

39. The method of claim 30, wherein sending to the retry point the message which indicates that the sender communication failed to reach the intended recipient includes detecting if the sender communication fails to reach the intended recipient on one of the plurality of logical components between the retry point and the intended recipient.

40. The method of claim 30, wherein resending the sender communication to the intended recipient only from the retry point includes selecting a new communication path that resides at least partially on a device that is external to a corresponding device of the retry point.

41. The method of claim 40, wherein determining whether the sender communication is retriable includes determining whether the new communication path is to be used.

42. The method of claim 41, further comprising determining whether the sender communication is secure, then determining that the sender communication is not retriable if the new communication path is to be used to resend the sender communication.

43. The method of claim 30, wherein determining whether the sender communication is retriable includes determining whether the sender communication is secured, and determining whether resending the sender communication to the intended recipient includes using a communication device external to the first communication path.

44. The method of claim 21, wherein said logical component is a particular component that is positioned at least one component away from the retry point within said sequence.

45. A system for managing communications between a sender and an intended recipient, the system being implemented on a device comprising a plurality of logical components, coupled in a sequence, that sequentially combine to forward a sender communication to the intended recipient, the system comprising:

a memory that stores data that identifies one or more characteristics of communication and indicates whether communication that have those one or more characteristics are retriable; and a retry component in the plurality of logical components that identifies the characteristic in the sender communication, and accesses the memory to determine whether to retry sending the sender communication if the sender communication fails to reach the intended recipient;

wherein the retry component is the only component of the plurality of logical components that is designated to retry sending the sender communication to the intended recipient;

wherein multiple components, in the plurality of logical components, are configured to respond to the sender communication failing by:
  (a) constructing a message which indicates that the sender communication failed, and
  (b) sending the message to the retry component without themselves retrying to send the sender communication to the intended recipient; and wherein at least one of the multiple components is configured to respond to the sender communication failing by sending the message directly to the retry component, wherein sending the message directly to the retry component comprises bypassing least one other component of the multiple components; and wherein at least one of the multiple components is a component that is not positioned within said sequence to receive communications directly from the retry component.

46. The system of claim 45, wherein the data stored in memory indicates whether the sender communication is retriable based on whether the sender communication is secured.

47. The system of claim 45, wherein the data stored to memory indicates whether the sender communication is retriable based on an operation of the sender communication.

48. The system of claim 45, wherein the retry component is configured as the only component of the plurality of logical components to retry sender communications that fail to reach the intended recipient.

49. The system of claim 48, wherein the retry component is configured to select, to serve as a transmission path to retry sending the communication, a combination of components from a group of components that include the plurality of logical components of the device, wherein at least some of the components in the group of components are external to the device.

50. The system of claim 45, wherein said component is a particular component that is positioned at least one component away from the retry component within said sequence.

51. A system for managing communications between a sender and an intended recipient, the system comprising:

a plurality of logical components coupled in a sequence to sequentially forward a sender communication from the sender to the intended recipient;

a retry component, in the plurality of logical components, that is designated to retry sending the sender communication to the intended recipient if the sender communication fails to reach the intended recipient;

wherein the retry component resides on a load-balancing device that receives the sender communication from the sender, and sends the sender communication to a server machine that includes other components in the plurality of logical components;

wherein the retry component is the only component of the plurality of logical components that is designated to retry sending the sender communication in the intended recipient; and multiple components, in the plurality of logical components, that respond to the sender communication failing by:
  (a) constructing a message which indicates that the sender communication failed, and
  (b) sending the message to the retry component without themselves retrying to send the sender communication to the intended recipient;

wherein at least one of the multiple components is a component that is not positioned within said sequence to receive communications directly from the retry component.

52. A system for managing communications between a sender and an intended recipient, the system comprising:

a plurality of logical components coupled in a sequence to sequentially forward a sender communication from the sender to the intended recipient;

a retry component, in the plurality of logical components, that is designated to retry sending the sender communication to the intended recipient if the sender communication fails to reach the intended recipient;

wherein the retry component is the only component of the plurality of logical components that is designated to retry sending the sender communication to the intended recipient; and an external monitor that is external to the plurality of logical components, the external monitor being configured to detect whether the sender communication failed to reach the intended recipient, and to communicate to the retry component when the sender communication fails to reach the intended recipient; and multiple components, in the plurality of logical components, that respond to the sender communication failing by:
  (a) constructing a message which indicates that the sender communication failed, and
  (b) sending the message to the external monitor without themselves retrying to send the sender communication to the intended recipient;

wherein at least one of the multiple components is a component that is not positioned within said sequence to receive communication directly from the retry component.

* * * * *

UNITED STATES PATENT AND TRADEMARK OFFICE
CERTIFICATE OF CORRECTION

PATENT NO.         : 7,337,234 B2
APPLICATION NO. : 10/118203
DATED                 : February 26, 2008
INVENTOR(S)        : Hu et al.

It is certified that error appears in the above-identified patent and that said Letters Patent is hereby corrected as shown below:

In column 15, line 14, in claim 1, delete "die" and insert -- the --, therefor.

In column 15, line 32, in claim 3, delete "time" and insert -- the --, therefor.

In column 15, line 34, in claim 4, delete "oh" and insert -- of a --, therefor.

In column 15, line 50, in claim 8, delete "reliable" and insert -- retriable --, therefor.

In column 15, line 54, in claim 9, after "characteristic" delete ",".

In column 15, line 61, in claim 10, delete "react" and insert -- reach --, therefor.

In column 16, line 9, in claim 15, delete "8," and insert -- 1, --, therefor.

In column 16, line 10, in claim 15, delete "an" and insert -- on --, therefor.

In column 16, line 23, in claim 17, delete "lees" and insert -- less --, therefor.

In column 16, line 27, in claim 18, delete "thy" and insert -- the --, therefor.

In column 16, line 37, in claim 21, delete "communication," and insert -- communications, --, therefor.

In column 17, line 10, in claim 21, delete "communication" and insert -- communications --, therefor.

In column 17, line 24, in claim 25, delete "designing" and insert -- designating --, therefor.

In column 17, line 30, in claim 26, delete "they" and insert -- after --, therefor.

In column 17, line 35, in claim 28, delete "designing" and insert -- designating --, therefor.

UNITED STATES PATENT AND TRADEMARK OFFICE
CERTIFICATE OF CORRECTION

PATENT NO. : 7,337,234 B2
APPLICATION NO. : 10/118203
DATED : February 26, 2008
INVENTOR(S) : Hu et al.

It is certified that error appears in the above-identified patent and that said Letters Patent is hereby corrected as shown below:

In column 18, line 63, in claim 45, delete "communication" and insert -- communications --, therefor.

In column 19, line 20, in claim 45, delete "least" and insert -- at least --, therefor.

In column 19, line 30, in claim 47, delete "to" and insert -- in --, therefor.

In column 20, line 53, in claim 52, delete "communication" and insert -- communications --, therefor.

Signed and Sealed this

Third Day of November, 2009

David J. Kappos
*Director of the United States Patent and Trademark Office*